United States Patent [19]

Skinner et al.

[11] 4,036,456
[45] July 19, 1977

[54] ROCKET CATAPULT WITH DIRECT MECHANICALLY ACTUATED IGNITION OF ROCKET MOTOR

[75] Inventors: Everett B. Skinner, Gilbert; James O. Lair, Tempe, both of Ariz.

[73] Assignee: Talley Industries of Arizona, Inc., Mesa, Ariz.

[21] Appl. No.: 555,444

[22] Filed: Mar. 5, 1975

[51] Int. Cl.² .................................... B64D 25/10
[52] U.S. Cl. .................. 244/122 AD; 89/1.816; 244/122 AB
[58] Field of Search .... 244/122 AD, 122 A, 122 AB, 244/122 AC, 141; 89/1.806, 1.807, 1.813, 1.816, 1.818

[56] References Cited

U.S. PATENT DOCUMENTS

| | | |
|---|---|---|
| 2,954,947 | 10/1960 | Zabelka et al. ............... 244/122 AB |
| 3,126,177 | 3/1964 | Markowitz .................... 244/122 AB |

Primary Examiner—Stephen G. Kunin
Assistant Examiner—Barry L. Kelmachter
Attorney, Agent, or Firm—Pennie & Edmonds

[57] ABSTRACT

An improved rocket catapult is disclosed for use in aircraft ejection systems permitting direct ignition of the rocket motor by a mechanically-actuated igniter situated in proximity to the rocket motor grain and which is actuated when the rocket motor has traveled a predetermined distance during the catapult phase of its operation.

9 Claims, 5 Drawing Figures

FIG. 3
FIG. 4
FIG. 5
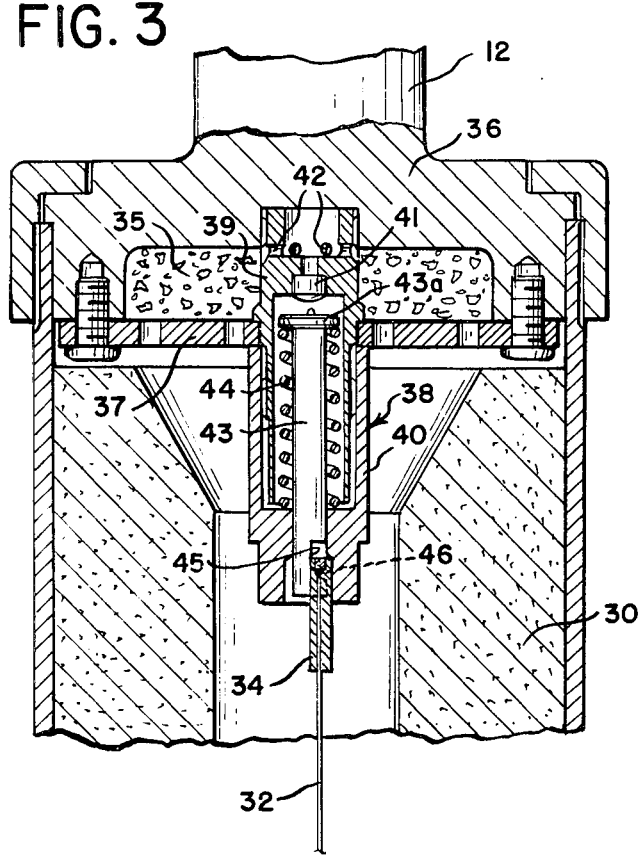
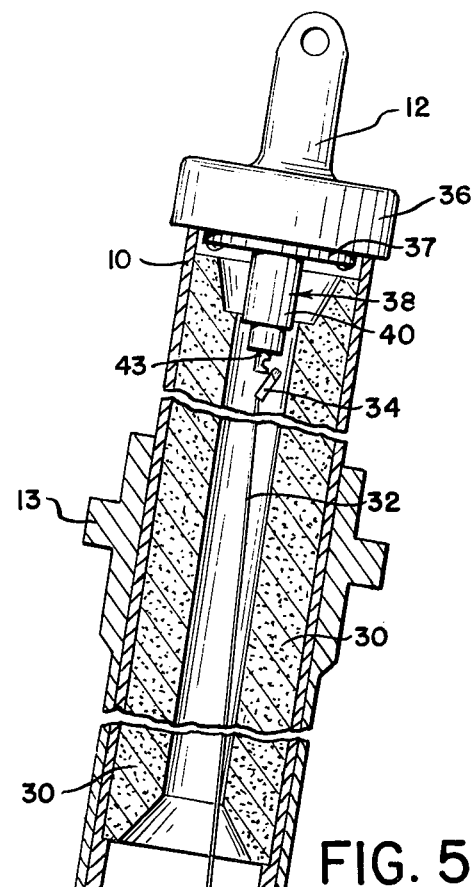
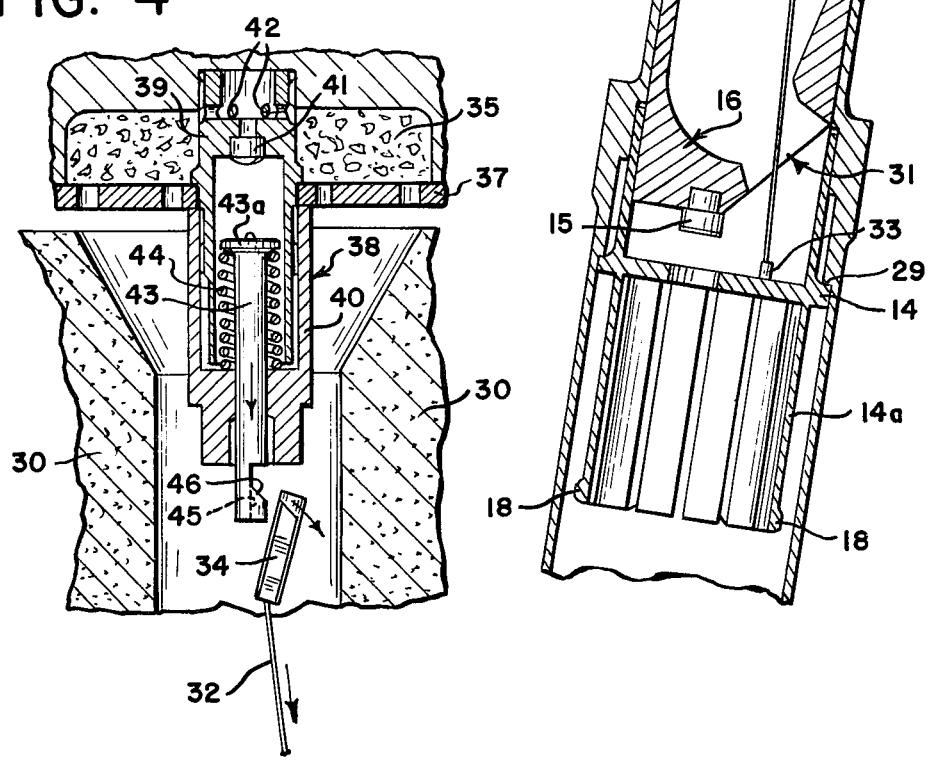

ROCKET CATAPULT WITH DIRECT MECHANICALLY ACTUATED IGNITION OF ROCKET MOTOR

FIELD OF THE INVENTION

This invention relates to ejection systems for safely ejecting a crew member from an aircraft, and more particularly to an improved rocket catapult for use in such ejection systems. The rocket catapult may be employed in an ejection system either to eject a seat or, in some instances, a capsule containing one or more crew members. It is more widely used in connected with a seat, which is movably mounted on generally vertical guide rails in the aircraft. The rocket catapult operates in two phases. In the first, or catapult phase, the device functions as a catapult powered by a ballistic gas generating propellant to launch the seat along with the crew member in it (generally referred to as the man-seat mass) up the rails. In the second phase of its operation, a solid fuel rocket motor exhausting through a rearwardly and downwardly canted nozzle, the thrust line of which extends approximately through the center of gravity of the man-seat mass, propels the mass in free flight clear of the aircraft and with enough altitude gain, especially important during low level ejections, for safe parachute opening and descent.

BACKGROUND OF THE INVENTION

First developed in 1956 (see U.S. Pat. No. 2,900,150), rocket catapults comprise generally an outer catapult tube within which is a rocket motor tube containing a solid fuel rocket motor, or propellant grain, which powers the unit in free flight. The two tubes are connected in telescoping relationship, with the catapult tube mounted to the aircraft body and the rocket motor tube fastened to the seat, and during the catapult phase of its operation, the two tubes telescope apart to propel the man-seat mass up the guide rails.

During the catapult stroke, powered by the catapult propellant or cartridge, hot high pressure gases are generated which act against a lower piston face of the rocket motor tube to drive it upward. At a predetermined point in the catapult stroke, the hot catapult gases are vented into the rocket motor tube such that they contact and ignite the rocket motor grain to commence the second phase of the unit's operation. Usually, one or more auxiliary igniters are provided in proximity to the rocket motor grain which are more readily ignited by the hot catapult gases than the grain itself and which aid ignition of the grain. Generally, such auxiliary igniters are simply cavities of granular heat sensitive material, but in certain cases auxiliary igniters have been used which are responsive to the pressure of the incoming gas. In such instances, the pressure actuates a firing pin which fires auxiliary igniter material through a primer train. Both types of auxiliary igniter are therefore dependent upon the state (i.e. the temperature and pressure) of the gas ported into the rocket motor tube to achieve rocket motor ignition.

Two slightly different forms of rocket catapult are in general use today, both of which are designed and operated in accordance with the foregoing description and principles. One such type, illustrated in the above-mentioned U.S. Pat. No. 2,900,150, employs a so-called "tang lock" which both forms the piston face against which the catapult gases act during the first phase of operation and which also serves to lock the inner and outer tubes together prior to operation and to unlock them upon actuation of the unit. The tang lock is attached to the lower end of the rocket motor tube until it is stripped off of that tube upon contact with a shoulder formed in the inner wall of the catapult tube, whereupon a passageway is formed to vent the catapult gases up into the rocket motor tube to ignite the rocket motor.

A second form of rocket catapult, illustrated in U.S. Pat. No. 2,954,947, provides a so-called "booster tube"-mounted co-axially in the rocket motor tube within the rocket motor grain, and within which the catapult propellant is provided. The internal volume of the booster tube is initially isolated from the area of the rocket motor grain, and the hot catapult gases are vented down through one port of a multi-nozzle such that they act against a piston face provided immediately below the nozzle during the catapult stroke. A slide valve in the booster tube, initially closed, is actuable through a lost motion linkage, including a wire cable extending from within the booster tube through the open nozzle port and connected to the base of the catapult tube. As the rocket motor tube accelerates up the catapult tube, it reaches a certain point where the cable is pulled taut and actuates the slide valve to port the hot catapult gases in the booster tube out into the area of the rocket motor grain, causing rocket motor ignition.

Inasmuch as rocket catapults are used almost exclusively in military aircraft, they must be capable of operation under a wide variety of conditions, including a temperature range of from −65° to about 200° F. They are also required to undergo severe vibration testing and, in addition, must not exceed maximum limits of acceleration or rate of change of acceleration (generally referred to as rate of onset); otherwise, the forces applied to the crew member during ejection may severely injure him.

The limitations on maximum acceleration and rate of onset become especially critical at high operating temperatures, when the gas generated by the catapult cartridge or propellant is at maximum temperature and pressure, leading to a fast catapult stroke and rapid ignition of the rocket motor. On the other hand, enough gas pressure must be generated by the catapult or propellant so that even at low operating temperatures, the relatively low pressures and temperature gas relied upon to ignite the rocket motor is capable of doing so prior to separation of the catapult and rocket motor tubes. Because all rocket catapults to date have relied upon the hot catapult gases to ignite the rocket motor, it has at times been difficult to design particular units to obtain proper operation within the severe specification limits applicable. Accordingly, it is an object of the present invention to provide an improved rocket catapult in which rocket motor ignition is achieved by a directly mechanically actuated auxiliary igniter, such that rocket motor ignition is not dependent in any way upon the pressure or temperature of the catapult gases for ignition. This is achieved in accordance with the invention in a manner fully consistent with the severe environmental and operational requirements applicable to rocket catapults.

SUMMARY OF THE INVENTION

In accordance with the invention, an improved rocket catapult is provided in which the rocket motor is directly mechanically ignited at a predetermined point in the catapult stroke, in a manner not dependent in any way upon the hot catapult gases. A mechanically actuable igniter is provided within the rocket motor tube in proximity to the motor grain, and is connected through a cable or equivalent actuating means to an element of the rocket catapult which is retained in the catapult portion of the unit after ejection and is not ejected with the rocket motor tube. The lower end of the actuating means may be fastened to the tang lock or to the catapult tube itself, depending upon the specific construction of the unit and particularly whether or not the cable or other connecting means is exposed to contact with the rocket grain before the unit is actuated.

In the first form of rocket catapult described above, the actuating means may be connected between a mechanically actuable auxiliary igniter in the upper, or so-called "head" end, of the rocket motor tube, and the tang lock. Preferably, the connecting means is a thin, flexible, lightweight stranded steel cable extending from the head end auxiliary igniter through the nozzle and anchored in the tang lock. In view of the severe vibrational requirements that rocket catapults are required to withstand, the cable is preferably provided with some degree of slack in order to minimize the possibility of its breaking during vibration. The cable is preferably so light and flexible that it is "dead", i.e. it does not have any resonant vibrational modes under the conditions imposed by standard vibrational test requirements applicable to these units. It is consequently preferable to anchor the lower end of the cable in the tang lock so that it does not extend into the internal volume of the unit filled by hot gases during the catapult stroke which, in view of the thinness of the cable, might possibly burn it through during the stroke, preventing rocket motor ignition.

In the case of a rocket catapult construction in which the central internal volume, inside the grain, of the rocket motor tube is isolated from the grain by a booster tube or similar shield, the cable may be made thicker inasmuch as it can not damage the motor grain by vibration. The cable may therefore be anchored in the base of the catapult, for this construction, because it can be made thick enough so as not to be burned through by hot gases during the catapult stroke.

The head end mechanical igniter mechanism in either case may comprise a cavity of readily ignitable material actuable by a spring-loaded firing pin through a primer, such that a downward force exerted by the cable or other connecting means on the firing pin causes the latter to fire the auxiliary igniter. A preferred form of mechanical auxiliary igniter illustrated herein includes a spring-loaded firing pin axially aligned in the rocket motor tube such that when the connecting means is suddenly placed in tension during the operational cycle, it first pulls the firing pin down against the firing pin spring. After the firing pin has traveled downwardly enough to compress its actuating spring, the connecting means automatically separates from it so that the spring rapidly throws the firing pin upward against the primer to fire the igniter. This may be achieved by fastening the connecting means permanently to the firing pin and making the breaking strength of the connecting means high enough so that, when tensioned, it is capable of retracting the firing pin against the firing pin spring with enough force to assure ignition of the primer, yet low enough so as not to significantly slow or distrub the upward travel and momentum of the rocket motor. Alternatively, as specifically illustrated herein, a mechanical release may be provided between the upper end of the connecting means and the firing pin.

DESCRIPTION OF THE DRAWINGS

Preferred embodiments of the invention will be described in conjunction with the annexed drawings, in which:

FIG. 3 is an enlarged sectional view of the upper portion of the rocket motor tube illustrating the mechanical ignition system in greater detail;

FIG. 4 is similar to FIG. 3 and shows the mechanism during actuation of the firing pin in the ignition; and FIG. 5 is a side elevational view, partly broken away, of the rocket catapult illustrating the mechanism of the invention immediately after the point of strip-off.

DESCRIPTION OF PREFERRED EMBODIMENTS OF THE INVENTION

Figure 1:
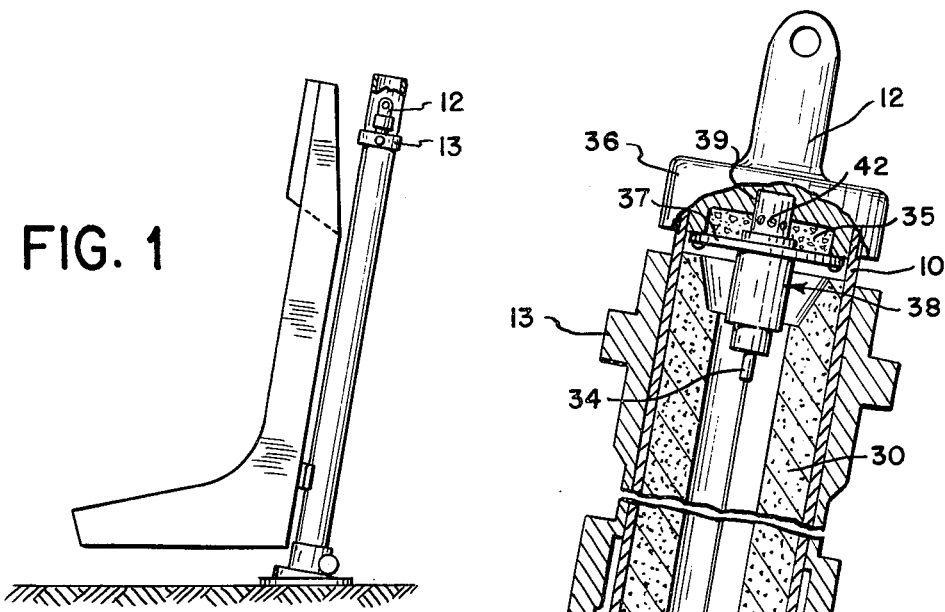
FIG. 1 is a schematic view of a rocket catapult attached to the rear of an aircraft seat.
Figure 2:
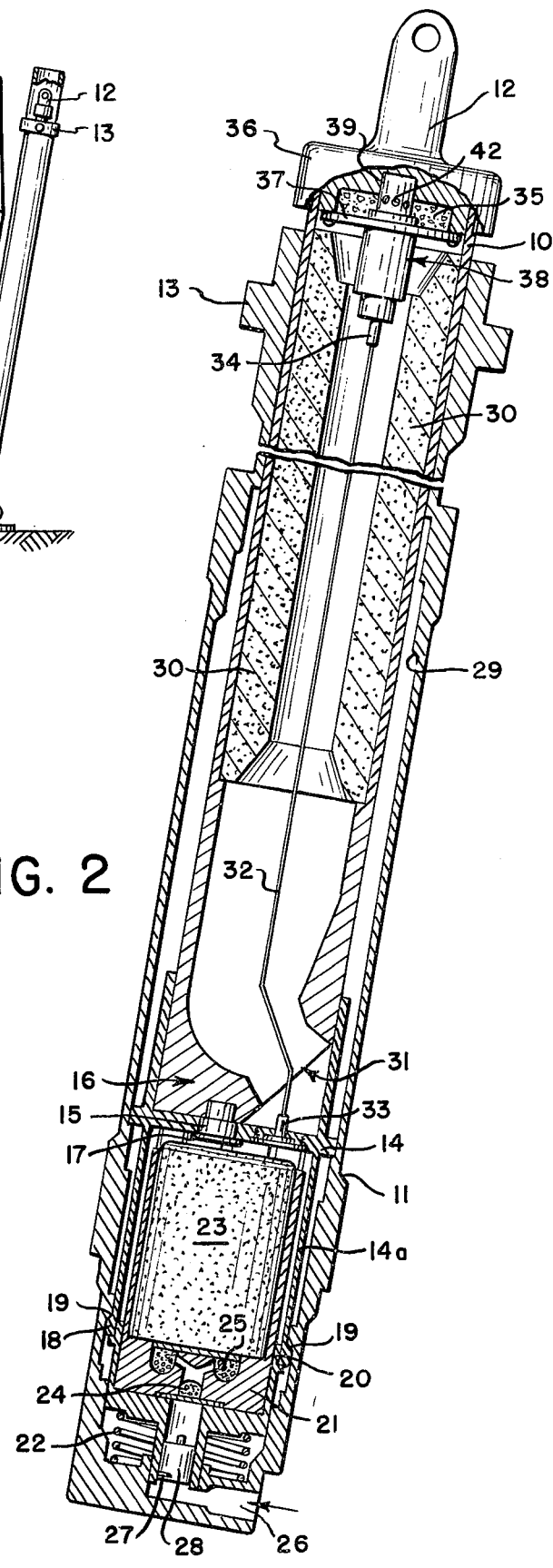
FIG. 2 is a side elevational view, partly broken away, of the entire rocket catapult illustrating the invention.

Referring to FIG. 2, a rocket catapult is shown including an inner rocket motor tube 10 and an outer catapult tube 11 such that the two tubes are capable of telescoping axially apart upon actuation. The top of the rocket motor tube is attached to the rear of the aircraft seat by seat lug 12, and the catapult tube is secured to the aircraft itself by attachment lugs 13.

The two tubes are held together, in order to retain the seat in the aircraft, by a locking mechanism including a tang lock 14, which is fastened to the nozzle (lower) end of the rocket motor tube by one or more plugs 15. Plug 15 extends through the tang lock and is threadedly engaged with the nozzle portion 16 of the rocket motor tube. The lower end of the plug forms a shear lip 17 which secures the tang lock to the rocket motor tube. Tang locks such as the one shown are generally known in connection with rocket capapults and understood to include a transverse plate, as shown, which forms a piston face against which the expanding catapult gases act during the catapult stroke, and a series of tines or fingers extending downwardly (and in some instances, not here shown, in both axial directions) and forming small external shoulders 18 at their lower ends which cooperate with corresponding shoulders 19 formed in the inner wall of the catapult tube to lock the two tubes together. The tang fingers are held outwardly by a cylindrical wall 20 forming part of a cartridge base 21 capable of moving axially to a limited extent and which is held in its uppermost position by a spring 22. A ballistic gas generating cartridge 23 is held in cartridge base 21, which also generally provides a primer cap 24 and additional igniter material 25 disposed to assure ignition of the propellant within cartridge 23. The particular cartridge base and associated assemblies described herein are merely illustrative; they are known in this art and other similar locking and cartridge ignition mechanisms are also known, any of which may be employed in rocket catapults constructed in accordance with the invention.

Operation of the rocket catapult illustrated in FIG. 2 is initiated by gas pressure from an external source (not shown) applied to inlet port 26. When the pressure reaches a certain level, shear pin 27 gives way and firing pin 28 is driven against primer cap 24 initiating the catapult cartridge 23. The high pressure gas immediately developed by burning of the propellant in cartridge 23 fills the internal volume of the catapult tube but is prevented from entering the rocket motor tube by the tang lock. The rising gas pressure therefore compresses cartridge base 21 downward against spring 22, lowering cylindrical wall 20 to free the lower ends of the tang fingers 14a. At that instant, the rocket motor tube becomes free, by virtue of the gas pressure applied to its lower piston face formed by the tang lock, to move up the catapult tube. Shoulders 18 and 19 cooperate to cam the tang fingers slightly radially inward as the rocket motor tube begins to move.

Within a very short time, by the time tang lock 14 reaches the shoulder 29 formed in the inner wall of the catapult tube, it is not uncommon for the rocket motor tube to be traveling relative to the catapult tube at velocities approaching 60 feet per second. Thus, although shoulder 29 completely stops the upward movement of tang lock 14, the momentum of the rocket motor tube remains relatively undisturbed, and shear lip 17 of plug 15 shears off to permit separation of the tang lock and rocket motor tube at that point.

In all prior rocket catapults, ignition of the solid fuel rocket motor grain 30 has been achieved at approximately the point last described in the operational cycle of the rocket catapult, and would have been achieved in the unit of FIG. 2 by hot catapult gases from cartridge 23 passing through the hole (or holes) previously stoppered by plug 15, through the nozzle 31 and into contact with the grain 30 and also commonly into contact with heat and/or pressure sensitive auxiliary igniters.

In contrast, on accordance with the invention, in the embodiment shown an actuating member in the form of a cable 32 is provided which is anchored at its lower end 33 in the tang lock 14, by any convenient method of attachment, and the upper end of which terminates in a small metal sear 34.

As shown in greater detail in FIG. 3, the sear may be attached to cable 32 by providing an axial bore and a slightly larger cavity in the upper end of the sear so that a slightly enlarged end formed in the cable itself securely fastens the sear and cable, as shown. Alternatively, any method may be used to permanently attach the cable to sear 34.

The directly mechanically actuable igniter in this embodiment of the invention is located in the upper end of the rocket motor tube and will accordingly be referred to as a "head end" igniter reflecting the generally accepted terminology applicable to auxiliary igniters placed in this position. A cavity 35 is formed in the head end 36 of the rocket motor tube within which readily ignitable particulate material may be contained of any type which is commonly employed in such auxiliary igniters. The igniter mechanism itself includes a circular plate 37 fastened to the head end of the rocket motor tube and containing perforations through which the igniter material in cavity 35, when ignited, can act upon the grain 30 to readily ignite it. A housing 38 is provided which, as shown, is formed of an upper member 39 and a lower member 40 which may be threadedly engaged to secure the housing to cover plate 37. The upper end of housing 38 contains a primer cap 41 in communication through holes 42 with the igniter material in cavity 35, such that ignition of the primer cap ignites the material 35. Housing 38 forms an axially extending cylinder within which is slidably mounted a firing pin 43, guided by engagement with the lower end of housing 38 and having an enlarged diameter head 43a against which a spring 44 acts, the lower end of spring 44 being constrained by the housing 38, as shown.

An axially extending channel 45 is formed in one surface of firing pin 43 forming a cavity at its upper end, the inner walls of the channel forming a cam surface 46 against which the enlarged head of sear 34 acts such that, when the sear and firing pin are within housing 38 as shown in FIG. 3, the sear can not be pulled downwardly without also moving the firing pin, thereby compressing spring 44 to "arm" the igniter.

As shown in FIG. 5, as the rocket motor tube travels upward relative to the catapult tube, tang lock 14 stops against shoulder 29 while shear lip 17 is sheared off to permit contined and substantially unimpeded movement of the rocket motor tube. Separation at this time of the tang lock from the rocket motor tube abruptly tensions cable 32 and at the same time, arms the firing pin 43 due to the interlocking relationship between sear 34 and the firing pin. As shown in FIG. 5, after the sear and firing pin have been pulled downwardly enough for the sear to clear the lower end of housing 38, the sear pulls away from the firing pin, through the action of cam surface 46, and the firing pin is then free to be driven by the now compressed spring 44 into primer cap 41, actuating the igniter to initate rocket motor grain 30. Thus, rocket motor grain 30 is ignited in accordance with the invention several milliseconds after separation of the tang lock from the rocket motor tube. This time period can be readily adjusted as desired by simply varying the length of cable 32.

Conventionally, the rocket motor grain is ignited and achieves about 10% motor pressure about ten milliseconds after strip-off (that is, the point in the catapult stroke at which the tang lock is stripped off the nozzle portion of the rocket motor tube), and reaches peak pressure roughly 0.040 seconds after strip-off. This time may vary significantly as it is dependent upon ambient temperature prior to firing. At lower temperatures, a longer time is required for rocket motor ignition and pressure development permitting some deceleration of the man-seat mass prior to reacceleration by the rocket motor, thereby subjecting the man to higher G-forces than are desirable.

The rocket motor ignition provided in accordance with the invention, in contact is completely independent of the temperature and pressure of the catapult gases, and the exact instant of ignition as a function of the relative positions of the rocket motor and catapult tubes may be much more accurately determined than was previously possible. This permits any deceleration and re-acceleration of the man-seat mass, especially at low temperatures as described above, to be minimized or eliminated. Most importantly, the exact instant or rocket motor ignition may be selected without considering any compromises due to the differences, previously encountered, in ignition at the hot and cold operational temperature extremes of the unit's operating range.

Rocket motors in rocket catapults commonly operate at relatively high internal pressures, of the order of 5,000 p.s.i., and the burn rate of the motor grain is highly pressure-dependent. Small obstructions which tend to decrease the effective throat diameter of nozzle 31 can not be tolerated under these conditions, for they may sufficiently increase motor pressure and hence burn rate of the grain to cause it to explode. It is desirable in such instances to expel the sear 34 and cable 32 through the nozzle as quickly as possible, preferably before full motor thrust has developed.

In accordance with the invention, the sear is made as small as practicable, consistent with strength requirements in order to minimize any obstructions in the nozzle area. Additionally, cable 32 is chosen to have a small elastic stretch capability, of the order of three or four percent stretch factor, so that the stretched cable tends to snap sear 34 down and out of the nozzle as quickly as possible after the sear separates from the firing pin. While the exact amount by which use of a stretchable cable as described above may accelerate expulsion of the sear through the nozzle is not known, it is believed that such acceleration may add to the reliability of the unit, particularly in the case of higher pressure motors and relatively small throat diameter nozzles.

A preferred wire cable 32 which has been found highly suitable for this application is 49-strand stainless steel miniaturized cable with a nominal diameter of about 0.036 inches with an 0.004 inch soft nylon coating. The cable length should be somewhat greater, for example by about one-half inch, than the minimum length necessary. Such added length as well as the light weight and flexibility of the cable prevent its having independent resonant vibrational modes such as might lead to cable breakage under the severe conditions of vibration that may be encountered with rocket catapults. Nylon or other soft plastic coating enhances the "deadness" of the cable as well as its fatigue life. It has been found that even with such a cable lying directly against the interior of the motor grain, severe vibrational conditions do not cause any damage to the grain. Preventing damage to the grain is critical because any increased burn surface caused by cracks in the grain interior would raise the motor burn rate and tend to cause failure through explosion, as would any loose pieces of the propellant grain if they were expelled from the nozzle during motor burn.

The lower end of the cable may be connected to any anchoring portion or member of the rocket catapult, i.e. the catapult tube base, the tang lock, or some other similar element which is maintained within the catapult tube and is not ejected with the rocket motor tube, such that it is capable of actuating the igniter in accordance with invention.

Other types of rocket catapult wherein a so-called booster tube extending substantially the length of the rocket motor tube is employed permit utilizing larger diameter, heavier cable actuating means, since the latter would not be exposed directly to the motor grain. Additionally, the booster tube avoids the necessity to expel the cable and/or sear from the rocket motor tube, so that it may only be necessary to add a directly mechanically actuable igniter disposed to fire directly upon the motor grain, e.g. in the head end of the rocket motor tube, and actuably connect it to the conventional valve-operated mechanism for initiating the rocket motor.

It will be apparent to those skilled in this art that various modifications may be made to the specific embodiments of the invention disclosed herein without departing from the scope and spirit of the invention, which is limited solely in accordance with the claims herein.

We claim:

1. In a rocket catapult having a catapult tube and a rocket motor tube capable of telescoping apart upon actuation to eject a mass from a vehicle, the rocket motor tube having an exhaust nozzle at its lower end and containing a solid fuel propellant charge, the improvement for causing ignition of such propellent charge comprising: a mechanically actuable igniter in the rocket motor tube disposed to ignite such propellant; and mechanical actuating means connected said igniter and an anchoring portion of the rocket catapult which is maintained within the catapult tube throughout operation of the rocket catapult, for directly mechanically actuating said igniter when the rocket motor tube has traveled a predetermined distance with respect to the catapult tube.

2. A rocket catapult as defined in claim 1 wherein such rocket catapult includes a cover member for sealing said nozzle against entry of gases into contact with said propellant during a first phase of operation of the rocket catapult, and means for stripping said cover member away from the nozzle at a predetermined point in the travel of the rocket motor tube relative to the catapult tube, said anchoring portion beingconstituted by said cover member.

3. A rocket catapult as defined in claim 2 wherein said mechanical actuating means is a flexible cable.

4. In a rocket catapult having a catapult tube and a rocket motor tube capable of telescoping apart upon actuation to eject a mass from a vehicle, the rocket motor having an exhaust nozzle at its lower end and containing a solid fuel propellant charge, such rocket catapult including a cover member for sealing the nozzle against entry of gases into contact with such propellant charge during a first phase of operation of the rocket catapult and means for stripping said cover member away from the nozzle at a predetermined point in the travel of the rocket motor tube relative to the catapult tube, the improvement for causing ignition of such propellant charge, comprising: a mechanically actuable igniter in the rocket motor tube disposed to ignite such propellant; and flexible cable means connected between said igniter and such cover member for directly mechanically actuating the igniter when the rocket motor tube has travelled a predetermined distance with respect to the catapult tube, said flexible cable being formed of stranded steel wire coated with a layer of flexible material and being longer than the minimum path length between the igniter and the point of attachment between the cover member and the cable, said cable being sufficiently lightweight and flexible to have no independent resonant vibrational modes, when the rocket catapult is vibrated, such as may damage the rocket motor propellant charge.

5. A rocket catapult as defined in claim 4 wherein said igniter includes a housing mounted in the upper end of the rocket motor tube and extending axially downward, an axially disposed firing pin within said housing, and a spring urging said firing pin upwardly, and the upper end of said cable is fastened to a sear, said sear and said firing pin being separably connected such that tension in the cable first pulls the firing pin axially downward and then permits the sear to separate from the firing pin, whereupon said spring causes the firing pin to actuate the igniter.

6. Apparatus as defined in claim 5 wherein said cable comprises about fifty stands of woven stainless steel wire having an aggregate diameter of about 0.04 inches coated with a thin, relative to the cable diameter, coating of flexible plastic, said sear comprising an elongated metal element forming a head at its upper end, and said firing pin including an axial passageway formed in its lower end to receive the sear and a cavity at the top of said passageway for receiving the head of the sear and forming a cam surface such that when the sear is pulled downwardly by the cable it pulls the firing pin until the head of the sear clears the housing, whereupon the cam surface operates to expel the sear and permitting actuation of the igniter.

7. A rocket catapult as defined in claim 5 wherein said cable has an elastic stretch factor of about 3 percent.

8. In a rocket catapult having a catapult tube and a rocket motor tube capable of telescoping apart upon actuation to eject a mass from a vehicle, the rocket motor tube having an exhaust nozzle at its lower end and containing a solid fuel propellant charge, the improvement for causing ignition of such propellant charge comprising a mechanically actuable igniter in the rocket motor tube disposed to ignite such propellant; mechanical actuating means connected at its upper end to said igniter and extending at its other end through said nozzle; and means for tensioning said connecting means at a predetermined point while the catapult and rocket motor tubes are telescoping apart for directly mechanically actuating said igniter.

9. In a rocket catapult having a catapult tube and a rocket motor tube capable of telescoping apart upon actuation to eject a mass from a vehicle, the rocket motor tube containing an annular solid fuel propellant charge and having an exhaust nozzle at its lower end and including a tube extending substantially the length of the rocket motor tube within the annular space formed by said solid fuel propellant charge, the improvement comprising a mechanically actuable igniter in the rocket motor tube disposed to ignite such propellant, and actuating means connected between said igniter and a lower portion of the catapult tube for directly mechanically actuating the igniter at a predetermined point during the travel of the rocket motor tube with respect to the catapult tube, said actuating means being heavy enough so as not to be burned through by exposure to hot gases during the catapult stroke.

* * * * *

UNITED STATES PATENT AND TRADEMARK OFFICE
CERTIFICATE OF CORRECTION

PATENT NO. : 4,036,456
DATED : July 19, 1977
INVENTOR(S) : Everett B. Skinner and James O. Lair It is certified that error appears in the above-identified patent and that said Letters Patent are hereby corrected as shown below:

Column 1, line 13, "connected" should read --connection--.

Column 1, lines 62-63, "operated" should read --operate--.

Column 2, line 15, "multi-nozzle" should read --multi-port nozzle--.

Column 4, line 37, "capapults" should read --catapults--.

Column 5, line 30, "on accordance" should read --in accordance--.

Column 6, line 12, "contined" should read --continued--.

Column 6, line 43, "in contact" should read --in contrast--.

Column 6, line 51, "instant or" should read --instant of--.

UNITED STATES PATENT AND TRADEMARK OFFICE
CERTIFICATE OF CORRECTION

PATENT NO. : 4,036,456
DATED : July 19, 1977
INVENTOR(S) : Everett B. Skinner and James O. Lair It is certified that error appears in the above-identified patent and that said Letters Patent are hereby corrected as shown below:

Column 7, line 41, "with invention" should read --with the invention--.

Column 8, line 1, "connected said" should read --connected between said--.

Column 8, line 15, "beingconstituted" should read --being constituted--.

Column 9, line 5, "anda" should read --and a--.

Signed and Sealed this

Fourteenth Day of February 1978

[SEAL]

Attest:

RUTH C. MASON
*Attesting Officer*

LUTRELLE F. PARKER
*Acting Commissioner of Patents and Trademarks*